United States Patent

Abbot

[15] 3,654,759

[45] Apr. 11, 1972

[54] APPARATUS FOR CONVERTING SOLAR ENERGY TO LOW COST POWER

[72] Inventor: Charles G. Abbot, 4409 Beechwood Road, Hyattsville, Md. 20782

[22] Filed: July 28, 1970

[21] Appl. No.: 58,838

[52] U.S. Cl.................................................60/26, 60/59 T
[51] Int. Cl........................................................F03q 7/02
[58] Field of Search..........................60/26, 59 T; 350/211

[56] References Cited

UNITED STATES PATENTS

| | | | |
|---|---|---|---|
| 1,599,481 | 9/1926 | Marcuse | 60/26 |
| 2,920,710 | 1/1960 | Howard | 60/26 UX |
| 2,968,916 | 1/1961 | Taylor et al. | 60/26 |
| 3,152,260 | 10/1964 | Cummings | 60/26 X |
| 3,203,167 | 8/1965 | Green, Jr. | 60/59 T X |
| 3,203,306 | 8/1965 | Lefferts | 350/211 |

*Primary Examiner*—Edgar W. Geoghegan
*Assistant Examiner*—Allen M. Ostrager
*Attorney*—Cameron, Kerkam & Sutton

[57] ABSTRACT

Solar energy is converted to useful energy by dividing a reflected solar beam into a plurality of concentrated cones of solar radiation. Each cone passes into a black box to heat air therein. The heated air is then converted to mechanical energy by suitable apparatus and the mechanical motion may in turn be converted to electrical energy. In simpler, but less efficient embodiments, said cones may be converted by thermoelectric means directly into electric currents.

6 Claims, 11 Drawing Figures

INVENTOR
CHARLES GREELEY ABBOT
BY
Cameron, Kerkam & Sutton
ATTORNEYS

PATENTED APR 11 1972 3,654,759
SHEET 2 OF 3
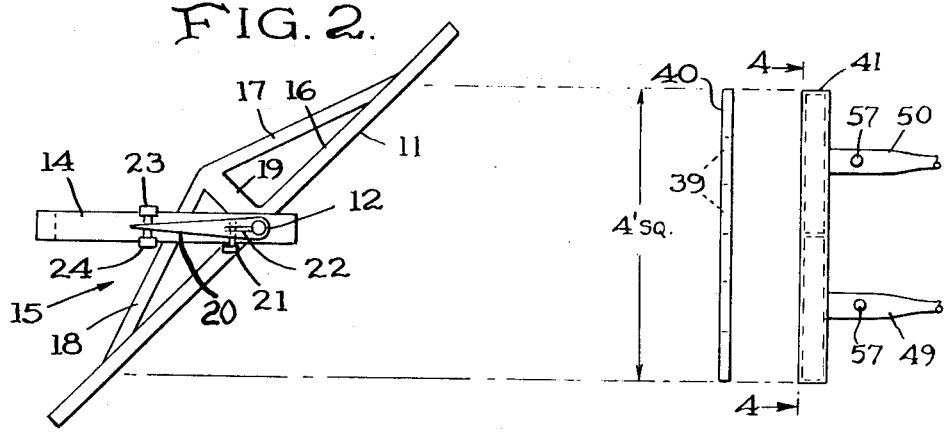
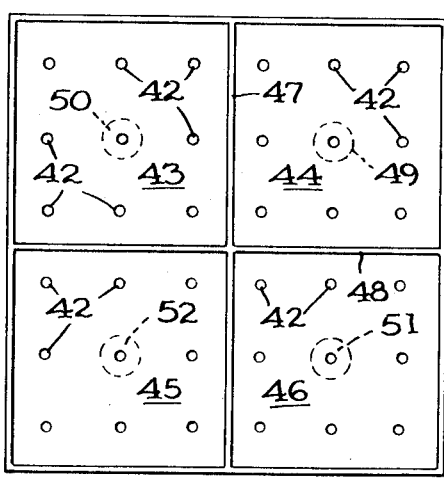
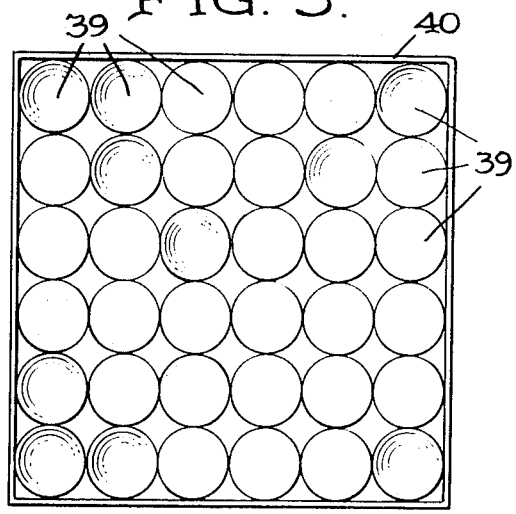
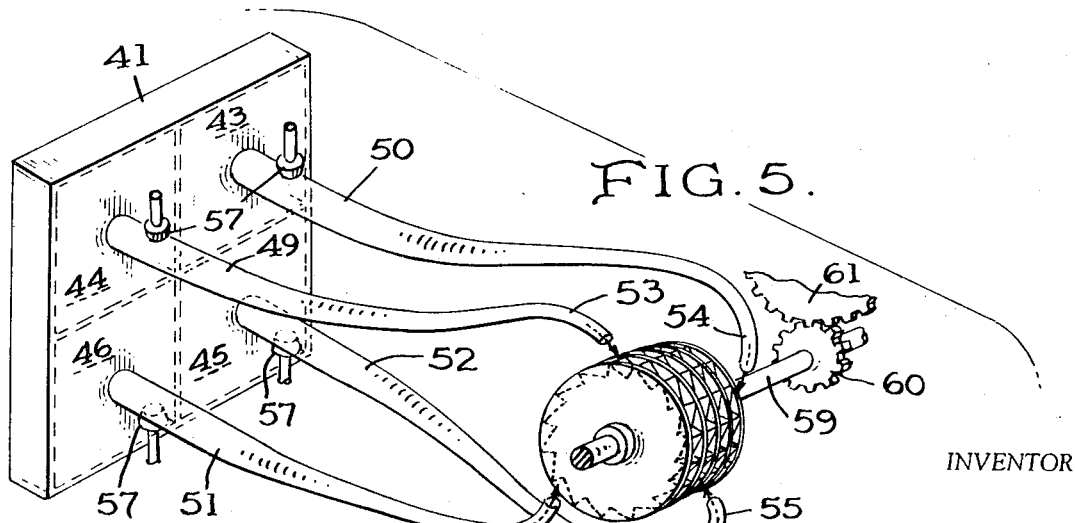
INVENTOR
CHARLES GREELEY ABBOT
BY Cameron, Kerkam & Sutton
ATTORNEYS

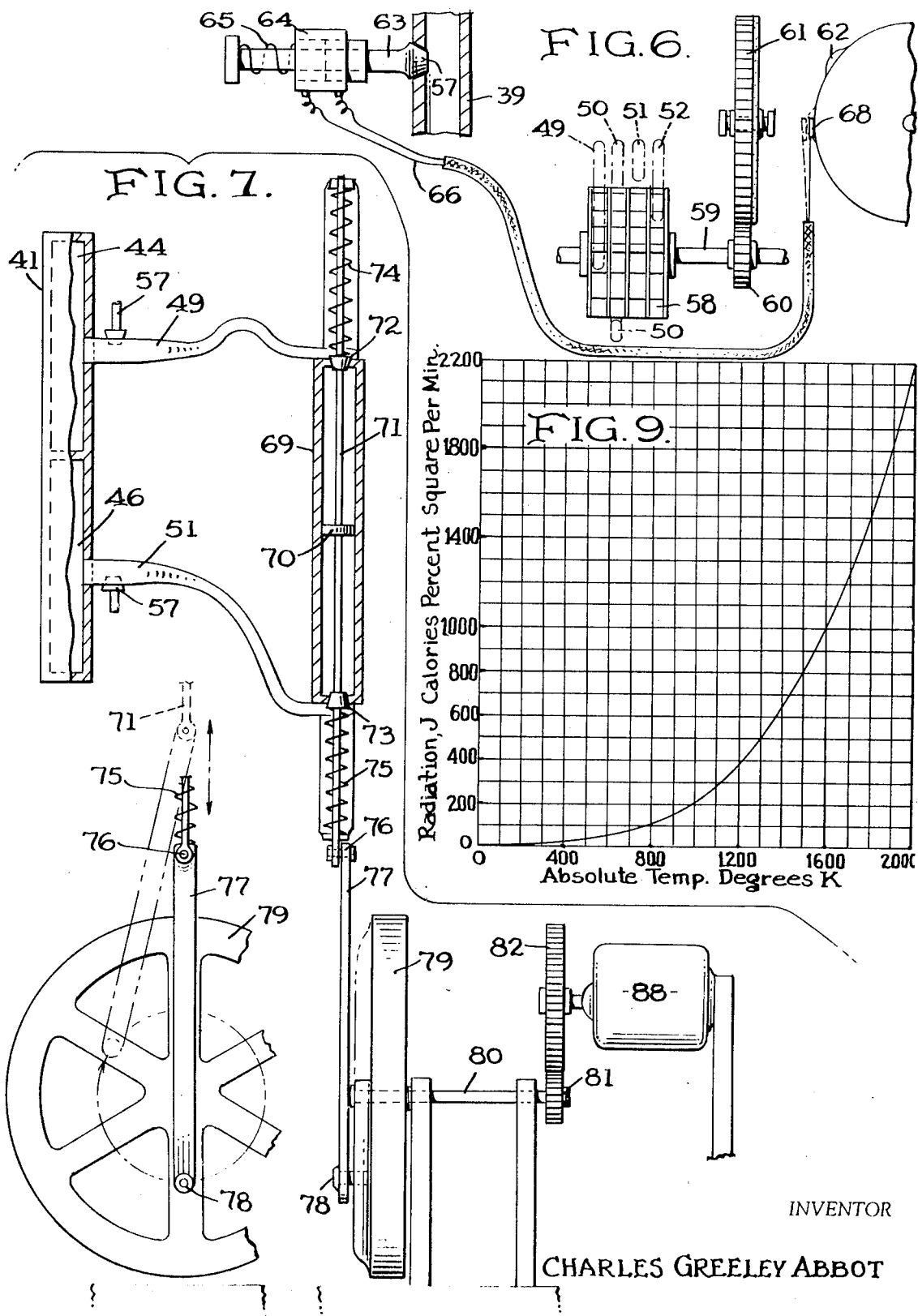

APPARATUS FOR CONVERTING SOLAR ENERGY TO LOW COST POWER

BACKGROUND OF THE INVENTION

The present invention relates generally to apparatus for harnessing solar radiation and more particularly to apparatus of the type for converting solar energy to useful power in an economical and efficient manner.

Because of the unlimited quantity of available energy of solar radiation, the idea of converting solar radiation to electrical energy is one that has occupied men's minds for years and many attempts have been made to harness solar radiation for commercial power generation. However, because the energy of solar radiation is so diffused, proposed arrangements for converting solar radiation to useful energy have hitherto been inefficient and impractical due to the large apparatus required and the attendant high cost, particularly with regard to the cost of accurately figured large optical surfaces, and supporting apparatus used to focus the Sun's rays.

Numerous patents have issued to me over the years for various means for converting solar energy to useful power. Such may be generally described as power plants utilizing natural heat in solar stoves and furnaces, some using water as the heat transfer medium and the like. My most recent patent in this field is U.S. Pat. No. 3,376,165 of Apr. 2, 1968, and this patent may be the most pertinent prior art patent. In this connection see also the several patents cited as references during the prosecution of that patent.

In my U.S. Pat. No. 3,376,165 of Apr. 2, 1968, the axis was a rectangle rotating about a line parallel to Earth's axis. Said rectangle contained axes at right angles whereby the mirror could be turned to reflect from any quarter. In the present application the axis of the siderostat will be supported only at one end. A split yoke will support the single plane mirror, adjustable to reflect sun rays at any daylight hour into a column 4 feet square, whose axis is parallel to Earth's axis. For brevity I call this collector of Sun-rays a RAY-STAT.

The numerous lenses which refract the solar radiation to concentration points may be considered as trapping the sun rays into groups. I will call the operation and its product a RAY-TRAP.

All of the rays gathered by one RAY-STAT are forced into one group within one steel box which I call a RAY-BOX One exception will be made. My patent of Apr. 2, 1968, depended on a direct conversion of each RAY-TRAP by thermoelectric junctions into electric power. But this simple conversion depended on thermal EMF of the order of only 0.000006 volts per degree rise of temperature, and was far too feeble to compete commercially with power from coal or oil. A sliced-off cone of sun-rays will be a definite number of times as bright as the rays at cone base. It will cover an area great enough to support a large plurality of electric thermal junctions. This feature promotes simple thermoelectric conversion of the energy of solar radiation to compete favorably in cost with power from coal or oil.

As is customary, I will use the terms "absolutely black body," and "perfect radiation," for a closed space, wherein rays must be reflected an unlimited number of times, until every wave-length reaches its full intensity for the temperature prevailing. Accordingly, the primary object of the present invention is to provide an improved apparatus for converting solar radiation to useful energy.

Another object of the present invention is to provide an improved solar-to-energy converter for producing large amounts of power from that inexhaustable free source, solar radiation without atmospheric pollution.

Another object of the present invention is to provide an improved solar-to-energy converter which through magnification of the intensity of solar energy provides an efficient and economical means for harnessing solar energy for commercial power generation. The converter should be located within 5° latitude, north or south of the earth's equator for optimum conversion, as for example, in the area of southern Colombia, South America.

Other objects and attendant advantages of the present invention will be apparent from the description thereof taken in connection with the accompanying drawings. The invention is capable of a variety of mechanical expressions, two of which are illustrated in the accompanying drawings. Therefore, it is to be expressly understood that the drawings are for the purpose of illustration only, and are not intended to represent the full scope of the invention which is defined by the appended claims.

SUMMARY OF THE INVENTION

In accordance with the present invention, there is provided a plane reflecting surface supported by suitable means for maintaining the reflecting surface oriented so as to provide a reflected beam of solar rays parallel to the Earth's polar axis. The reflected beam is subdivided into parallel beams by an array of Fresnel lenses, each of which directs a beam to a common focal plane, at which is supported an array of apertures which pass the solar energy of the individual beams to "black" enclosures to heat air therein. The total energy produced is a function of the size of the array, and can be multiplied by combining the output of a plurality of solar energy converters.

In one form of the present invention, the reflecting surface comprises a plane rectangular surface which reflects a fixed solar beam of square cross-section onto an array of lenses. The array of lenses is preferably formed from a plurality of Fresnel lenses, disposed with their axes parallel to the polar axis of the Earth. Double convex lenses may also be used. The lenses cover in area the entire cross-section of the fixed solar beam, and each lens refracts a converging cone of rays to a common focal plane. Here there is supported, at right angles to the Earth's polar axis, an "absolutely black" box, so-called, with apertures therein for each cone of rays to enter in a manner such that each one of the focused converging cones enters the box, and heats the air therein to provide an output of energy, which is the sum of the outputs of all the individual cones. To make the box air-tight, each opening for the foci is fully sealed by a small plate of heat-resisting, transparent crystal, as sapphite.

To obtain increased amounts of energy, it is only necessary to provide a plurality of the above-described individual solar energy-converting units, and locate the units so that they will not shade each other. Advantageously, in such an arrangement, the units are located in a north-south row, not over 25 feet apart. The output of the individual units is additively connected by air ducts or by electrical conductors when the radiation-heated air is converted to electricity. Also, more than one such north-south row can be provided, in which case each north-south row is successively separated in the east-west direction by a moderate distance.

BRIEF DESCRIPTION OF THE DRAWINGS

In the accompanying drawings, wherein like characters designate corresponding parts throughout the several figures:

FIG. 2 is a partial side view of the present invention, from the East at noon with the siderostat adjuncts removed for simplicity, to illustrate how the mirror-frame can be fixed and adjusted to follow the declination of the Sun and reflect a strong solar beam of 4 feet square cross-section parallel to the polar axis;

FIG. 3 is a view taken normal to the Earth's axis showing the array of lenses;

FIG. 4 is a view taken parallel to FIG. 3 showing the face of the "black" box;

FIG. 5 is a detail view of one device for converting heat energy to mechanical energy;

FIG. 6 is a view, partly in section, and at smaller scale, of the structure of FIG. 5;

FIG. 7 is a view, partly in section, of another device for converting heat energy to mechanical energy;

FIG. 8 is a view of a portion of the structure of FIG. 7 as seen from the left in FIG. 7;

3

Figure 10:
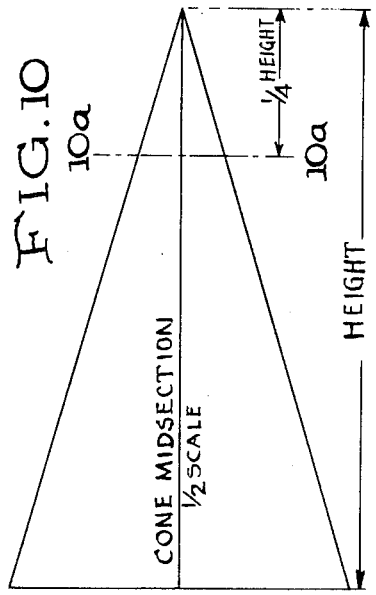
Figure 10A:
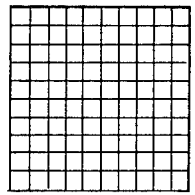

FIG. 9 is a graphic representation of a computed curve of temperature (Kelvin) and the radiation of an "absolutely black body" in calories per centimeter square per minute;

FIG. 10 is a view of a cone of rays sliced at one-quarter the cone's height, giving room for numerous thermoelectric junctions in a "Nobili Pile"; and FIG. 10a shows a grid for the thermoelectric junctions located on the line 10a—10a of FIG. 10.

DESCRIPTION OF THE PREFERRED EMBODIMENTS

Figure 1:
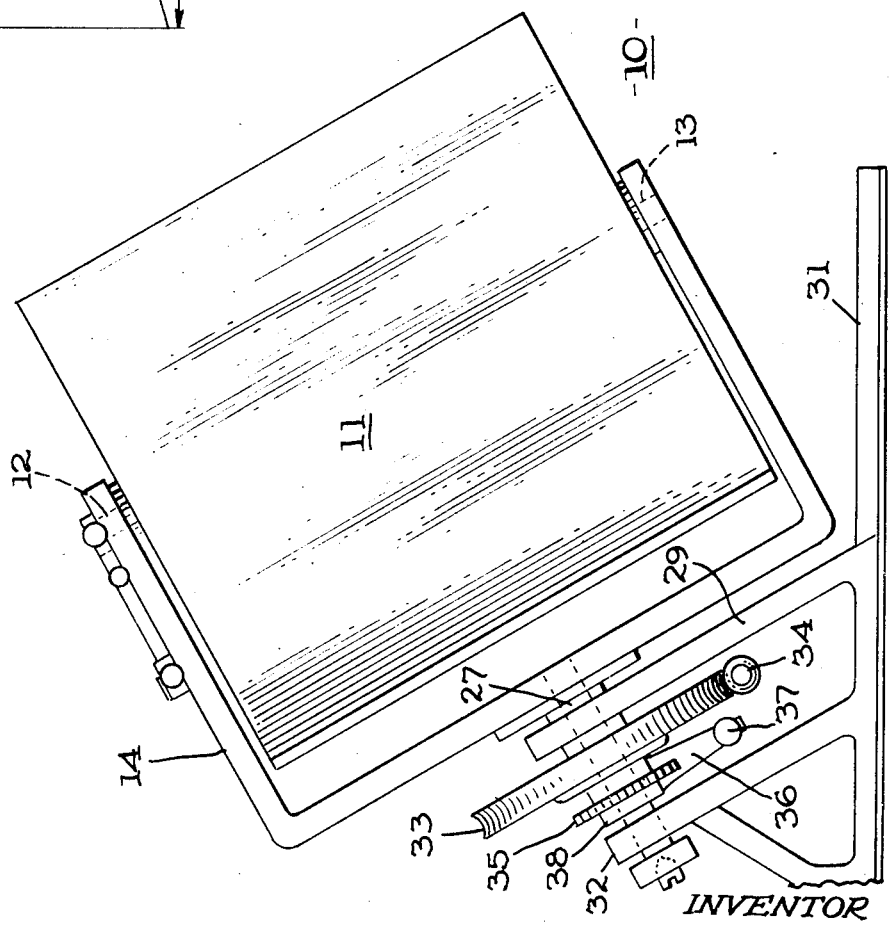
FIG. 1 is a partial side elevation of the present invention as viewed from the east at sunrise in 30° N. latitude.

Referring to the accompanying drawings, and in particular to FIG. 1, reference numeral 10 generally indicates a siderostat which supports a plane reflecting surface 11 for rotation about an axis parallel to the axis of the Earth. Reflecting surface 11 therefore lies in a north-south direction and is further pivotally mounted by trunnions 12 and 13 supported in an open yoke frame 14.

In this manner, the reflecting surface 11 maintains a reflected beam in a constant, fixed direction for all movements of the Sun for any daylight hour throughout the year. Such arrangements for following the Sun's diurnal path are well known.

A polar siderostat is a device familiar to astronomers and is frequently used to counteract the daily apparent motion of heavenly bodies to reflect in a constant direction the rays of a body observed. By infrequent slight adjustments, the polar siderostat maintains the fixed direction of a reflected beam constant for all daily apparent movements of the body. Accordingly, the polar siderostat and its associated driving means will not be described in detail and reference may be had to my prior U.S. Pat. Nos. 2,247,830; 2,460,482; or 2,906,257 for a fuller description thereof.

While within certain aspects of this invention the reflecting surface 11 may be of any suitable construction, advantageously the reflecting surface is in the form of a flat plane mirror. The mirror may be constructed of plate glass, silver plated on the rear, or it may be formed from a plurality of sheets of metal in which case the reflecting surface of the sheets is made highly reflective by a suitable coating material such as, for example, a film of rhodium, or by being composed of any suitably high reflective material such as, for example, an aluminum alloy, or preparations such as "Alumilite."

The mirror 11 is supported in any suitable manner so as to incline its axis in a north-south direction, and appropriate means such as are known to those skilled in the art are used for adjusting the mirror to conform with the declination of the Sun, as it varies from day to day in its north-south march. To this end, as shown in FIGS. 1 and 2, the mirror 11 is carried by frame 15 comprising a mirror support 16 and struts 17, 18 and 19. Frame 15 is pivotally supported to frame 14 by trunnions 12 and 13. The means for adjusting the mirror 11 on trunnions 12 and 13 may be of any suitable construction such as commonly used in astronomical instruments.

As more clearly shown in FIG. 2, an arm 20 is affixed to trunnion 12 and carries at one end a screw 21 for clamping the arm to the trunnion in any suitable manner such as, for example, by means of an expansion slot 22. The other end of arm 20 extends between a pair of adjusting screws 23 and 24 mounted on frame 14. A rough adjustment of the location of the mirror 11 may be affected by first loosening the screw 21 and approximately positioning the axis of the mirror 11, after which the screw 21 may be tightened. Accurate adjustment thereafter may be effected through manipulation of the screws 23 and 24. Thus, the axis of the mirror 11 may be adjusted daily in a north-south direction to conform with the position of the Sun in its annual march.

Frame 14 is provided with a trunnion 27 in a plane at right angles to the trunnions 12 and 13. Trunnion 27 is mounted by means of any suitable bearings in support 29 carried by suitable framework 31. Trunnion 27 presses against a thrust bearing 32 and is operatively connected to conventional driving means for rotating the frame 14 around the axis of the trunnion 27 to cause the mirror 11 to move through an angle of 15° per hour in following the diurnal movement of the Sun. For simplicity, the driving-means has not been shown in detail, but is represented by the worm wheel 33 and worm screw 34 driven by an electric motor (not shown). This may take the form of a driving means such as disclosed, for example, in my prior U.S. Pat. Nos. 2,141,330; 2,205,378; or 2,906,257. Angularity of the mirror 11 with respect to the Sun is thus made by means of handwheel 35 operatively connected to the worm wheel 33 through arm 36, adjusting screw mechanism 37 and split sleeve 38. Thus when the split sleeve is clamped, the worm wheel 33 will rotate the frame 14 to follow the Sun's daily course.

Disposed beyond the north end, and fastened upon a fixed frame, not shown, in a plane normal to the polar axis of the Earth, so as to be in the path of the solar rays reflected from the mirror 11, is an array of lenses. This array may be formed by a plurality of Fresnel lenses 39, shown in FIG. 3 as 36 in number. Closely juxtaposed, these lenses form an array which advantageously covers an area equal to the entire cross-section of the reflected solar beam. Each lens concentrates a converging cone of rays toward a common focal plane.

As more clearly shown in FIG. 3, the lenses may be fixed in any suitable manner to a flat frame member 40. The solar rays reflected from the mirror 11 form a parallel beam which is subdivided by the lenses into parallel converging cones, the focus point of each being in the same focal plane so as to define a plane array of focal points. In the illustrative embodiment of FIG. 3, the lenses are shown in circular form for clarity; however, it should be apparent that in such an arrangement a portion of the reflected beam is lost so that the use of square lenses provides the optimum arrangement.

At the focal plane, a hollow "black" box 41 is supported in frame 40 and at right angles to the Earth's axis. As shown in FIG. 4 box 41 has a plurality of openings 42 equal in number of the number of lenses 39. Each opening 42 is advantageously closed air-tight by a thin plate of sapphire, or other transparent substance, adapted to withstand high temperatures such as found on FIG. 9. As hereinbefore described, Ray-box 41 is disposed in the focal plane of the converging rays, so that the individual focus points of the lenses 39 each falls within a corresponding opening 42. In this manner, Ray-box 41 receives all of the reflected solar beam.

Box 41 is preferably about four feet square and is made of stainless steel, chrome plated and polished on both sides within and without, so as to be a substantially "absolutely black body." Box 41 is divided into four internal compartments 43–46 by intersecting partitions 47 and 48. The interior depth of box 41 is small compared to its lateral dimensions.

Each compartment 43–46 has nine openings 42 therein and receives one-fourth of the reflected solar radiation.

As seen in FIG. 5, tubes 49, 50, 51 and 52 open respectively into compartments 43–46 and taper to nozzles 53–56, respectively, at their outer ends. Each tube 49–52 has an electrically actuated valve 57 opening therein which valve is shown in more detail in FIG. 6. Nozzles 53–56 are directed toward a suitable turbine wheel 58, driving a shaft 59 and gear 60. Gear 60 in turn rotates cam wheel 61 provided with cam surfaces 62.

Valve 57 has a valve shaft 63 sliding in solenoid 64 and is normally urged toward closed position by spring 65. Electric current to energize solenoid 64 is provided by wires 66 and 67 connected to any suitable source of electricity, not shown, through switch 68 which is normally open but closed at appropriate time in the cycle of operation by cam 62. It will be understood that each of the four valves 57 has the structure above-described, and each has its own cam 62 on wheel 61 so that the valves 57 open sequentially at ninety degrees or at each quarter revolution of wheel 61 to admit ambient air to the associated one of said compartments.

The operation of the embodiment of FIGS. 1–6 should now be obvious. The cones of solar energy passing into compartments 43–46 almost instantaneously heats the air therein which rapidly expands and passing through the respective jet 53–56 rotates turbine wheel 58 and cam wheel 61. Rotation of cam wheel 61 closes switches 68 in sequence, energizing solenoids 64 in sequence, opening valves 57 in sequence, and supplying air to each of compartments 43–46 in sequence. Thus, in operation each jet 53–56 in turn acts to rotate the turbine 58 while the air in the other compartments is being heated. Each jet acts for a 90° rotation of turbine 58. The rotation of shaft 59 may be used to produce useful work as in the driving of an electric generator or the like.

The embodiment of FIGS. 7 and 8 utilizes the construction of FIGS. 1–4 but employs a different mechanism for utilization of the heated air from compartments 43–46. In FIG. 7 only two compartments 44 and 46 are shown, and it is to be understood that similar apparatus is employed for the other two compartments but is not shown for purposes of clarity in the drawings.

In FIG. 7 tube 49 from compartment 44 leads to one end of cylinder 69 while tube 51 leads to the opposite end of cylinder 69. A piston 70 is mounted in cylinder 69 and has piston rod 71 mounted thereon and passing through both ends of the cylinder. A valve 72 on rod 71 closes the opening of tube 49 into one end of cylinder 69. A valve 73 on rod 71 closes the opening of tube 51 into the other end of cylinder 69. It is to be understood that valves 72 and 73 are shown schematically only and valves well known in the steam engine art would here be employed. Springs 74 and 75 urge valves 72 and 73, respectively, toward closed position. Rod 71 is pivotally connected at 76 to connecting rod 77 which in turn is pivotally connected at 78 off center of fly wheel 79. Fly wheel 79 rotates shaft 80 and gears 81 and 82 to drive generator 83 to provide electric energy.

Piston 70 is a double acting piston and to start the embodiment of FIGS. 7 and 8 with the air heated in compartments 44 and 46, fly wheel 79 is rotated clockwise as seen in FIG. 8 and rod 71 is lifted opening valve 72 and admitting heated air from compartment 44 through tube 49 into the space above the piston. The highly heated air under pressure expands forcing piston 70 downwardly eventually closing valve 72 and opening valve 73. Heated air under pressure then flows through tube 51 into cylinder 69 beneath piston 70 forcing piston 70 upwards and the cycle is repeated. Valves 57 are provided in each of tubes 49 and 51, as in the first embodiment, and are timed by apparatus as shown in FIG. 6 driven by shaft 80 to admit air to each of compartments 44 and 46 during the partial work stroke of the other compartment.

With reference now to FIG. 9, the data there plotted shows the solar energy available for temperature in degrees Kelvin based on a solar constant of 1.946 to 1.95 cal. per cm$^2$ per minute based on Smithsonian Institution observations. Making allowance for reflection, refraction and small direct losses, I have concluded that at best equatorial locations about 21,000 calories would be collected per minute in box 41. Assuming a 90 percent efficiency in conversion from mechanical energy to electrical energy, calculations establish that the present invention can produce electricity at about 6½ cents per Kilowatt hour.

If the cones are all sliced at one-fourth height, the area of slice is one-sixteenth of the area of cone at the lens, and ray intensity at slice is 16 times the intensity at the lens. If intensity at the lens is 21,000 cal. per cm$^2$ per minute; if slice area bears 100 electric junctions; if EMF per junction is 0.000006 volts; if one Ray-stat feeds 36 lenses; then the total energy per Raystat is 2,016 volts divided by the resistance in ohms of the array. FIG. 10a shows 5 pairs of alleys per slice, each pair to be joined criss-cross in a path 5 $\sqrt{2}$ times one space in width, and made up of narrow thin strips of small resistance. The thermoelectric junctions being mounted on this grid and are connected as described in my U.S. Pat. No. 3,376,165.

By the present invention, there has been described a novel and efficient solar energy converter which can effectively utilize the solar radiation during all daylight hours of the year to produce mechanical and electrical energy. The utilization of this energy by the present invention provides a particularly advantageous solution to the problem of efficiently powering remotely located areas which are not accessible to established power stations. Large outputs may be provided by a plurality of converter combinations which can be located in north-south rows with the individual units appropriately joined, and a plurality of such north-south unit assemblies may be connected in east-west rows separated by moderate distances. Thus, the integrated combinations may be amplified indefinitely, the only limitation being the available space requirement.

Although the invention has been described with reference to only three embodiments thereof, it will be readily apparent, to those skilled in the art that various modifications may be made without departing from the inventive concept. For example, part of the power generated by these embodiments may be used for pumping water to an elevation for use as a source of energy during the hours of darkness thus providing a more or less uniform power output over a 24-hour day. In areas requiring irrigation the stored water may be used for irrigation and for power generation during sunless hours. It is therefore intended by the appended claims to cover all such modifications which fall within the true spirit and scope of the invention.

What I claim is:

1. A solar energy converter adapted to convert solar radiation to useful energy comprising means to cause the maintenance of a solar beam in a fixed direction parallel to the axis of the Earth at any daylight hour including a plane reflecting surface for reflecting the solar beam in the fixed direction, an array of lenses supported in the path of said reflected solar beam to subdivide the reflected beam into a plurality of focused beams having their foci located in a plane normal to the Earth's axis, a hollow "black box" disposed in said focal plane, an aperture in said box for each of said focused beams, compartments in said box, valves for each of said compartments, means for separately actuating said valves sequentially for admitting ambient air to at least one of said compartments and for removing heated air from at least one other of said compartments and means for converting the heated air from said compartments to mechanical motion.

2. A solar energy converter as set forth in claim 1 wherein said array of lenses are Fresnel lenses for subdividing said reflected solar beam into a plurality of focused conical beams forming said foci.

3. Apparatus for converting solar energy to useful energy comprising a plurality of spaced solar energy converting units arranged in a north-south row, each of said solar energy converting units including a plane reflecting surface arranged to maintain a reflected solar beam in a fixed direction parallel to the axis of the Earth at any daylight hour, optical means comprising an array of light directing elements supported in the path of said reflected solar beam to subdivide the reflected beam into a plurality of focused beams having their foci located in a plane normal to the Earth's axis, a hollow "absolutely black" box disposed in said focal plane for providing heated air in response to the energy of a subdivided focused beam, compartments in said box, valves for each of said compartments, means for sequentially actuating said valves for sequentially admitting ambient air to at least one of said compartments and for removing heated air from at least one other of said compartments and means utilizing said heated air to provide an energy output for a north-south row dependent on the contribution of the individual elements of each converting unit.

4. Apparatus for converting solar energy to useful energy as set forth in claim 3, further including a plurality of said north-south rows of converting units spaced in an east-west direction and means interconnecting the output of each north-south row to provide an overall output dependent on the contribution of the individual elements of each converting unit.

5. A solar energy converter as described in claim 1, said means for converting the heated air from said compartment to mechanical motion including a plurality of air jets connected to said compartments of said box and a turbine wheel rotated by said jets.

6. A solar energy converter as described in claim 1, said means for converting the heated air from said compartment to mechanical motion including a double acting piston, a cylinder for said piston, a piston rod extending through the ends of said cylinder, valves actuated by said rod at each end of said cylinder, tubes leading from said compartments in said box to each end of said cylinder and closed by the adjacent one of said valves and means for converting the movement of said rod to rotary motion.

* * * * *